United States Patent [19]

Kolchinsky et al.

[11] Patent Number: 4,611,632

[45] Date of Patent: Sep. 16, 1986

[54] HYDRAULIC SOLENOID VALVE STRUCTURE

[75] Inventors: Abel E. Kolchinsky, Glenview; Shaukat Kazi, Lincolnwood, both of Ill.

[73] Assignee: Imperial Clevite Inc., Glenview, Ill.

[21] Appl. No.: 730,850

[22] Filed: May 6, 1985

[51] Int. Cl.[4] ..................... F15B 13/044; F16K 31/06

[52] U.S. Cl. .......................... 137/625.65; 137/625.69; 251/129.1; 251/129.15; 251/337

[58] Field of Search ...................... 137/625.65, 625.69; 251/129, 137, 337, 129.1, 129.15; 267/170, 174, 179

[56] References Cited

U.S. PATENT DOCUMENTS

| | | | |
|---|---|---|---|
| 3,324,890 | 6/1967 | Whitmore et al. | 137/628.65 |
| 3,701,366 | 10/1972 | Tirelli et al. . | |
| 3,899,003 | 8/1975 | Tirelli . | |
| 3,945,399 | 3/1976 | Tirelli . | |
| 3,967,648 | 7/1976 | Tirelli . | |
| 4,313,468 | 2/1982 | Patel | 137/625.69 X |
| 4,412,196 | 10/1983 | Teichert . | |
| 4,418,720 | 12/1983 | Day et al. . | |
| 4,422,475 | 12/1983 | Aspinwall | 137/625.65 X |
| 4,526,201 | 7/1985 | Geyler et al. | 137/625.64 X |

*Primary Examiner*—Gerald A. Michalsky
*Attorney, Agent, or Firm*—Russell E. Baumann

[57] ABSTRACT

A hydraulic solenoid valve having a self-contained spool positioning spring and washer solenoid tube assembly. The valve body is provided with a novel arrangement of ports providing for minimized pressure differential between the opposite ends of the valve chamber so as to facilitate positioning of the spool and permit utilization of a light biasing spring and high force solenoids. The port configuration permits minimizing the overall height of the valve body while yet providing for a relatively large cross section tank port, providing the desirable low pressure differential between the opposite ends of the valve chamber. The biasing assemblies further provide for reduced effect of the pressure differential on the spool valve end shafts, thereby further facilitating repositioning of the spool in the neutral position by the biasing springs. Any one of a plurality of different strength springs may be utilized in the biasing assembly, wherein the springs are removably retained by a removable lock ring cooperating with the washer which serves as a spring retainer at one end of the spring.

21 Claims, 9 Drawing Figures

FIG. 6
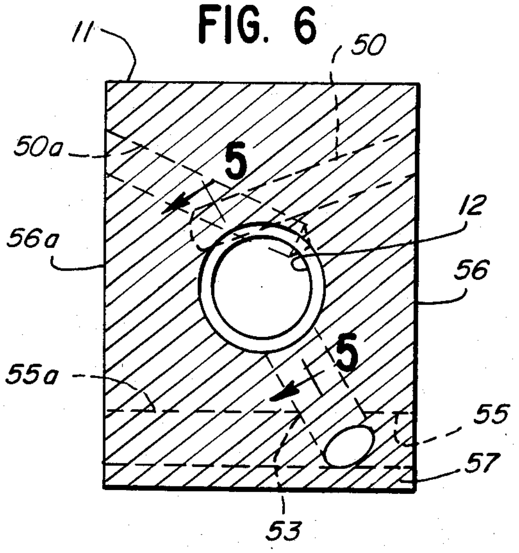
FIG. 5
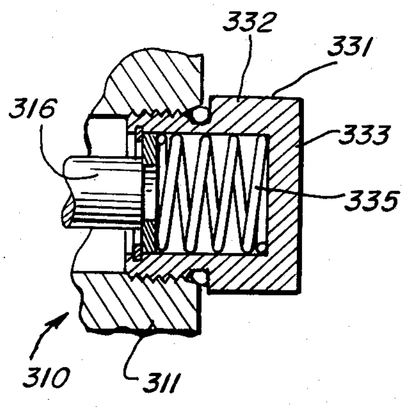
FIG. 7
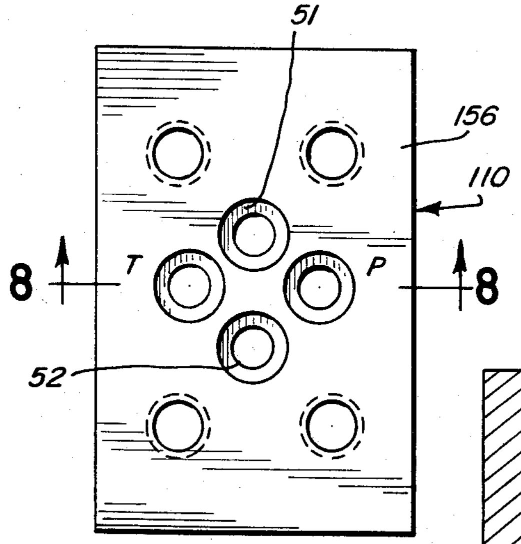
FIG. 4
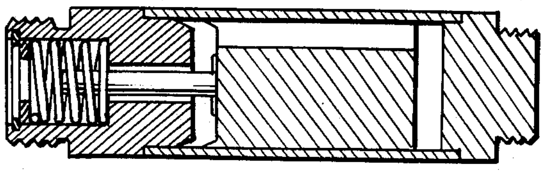
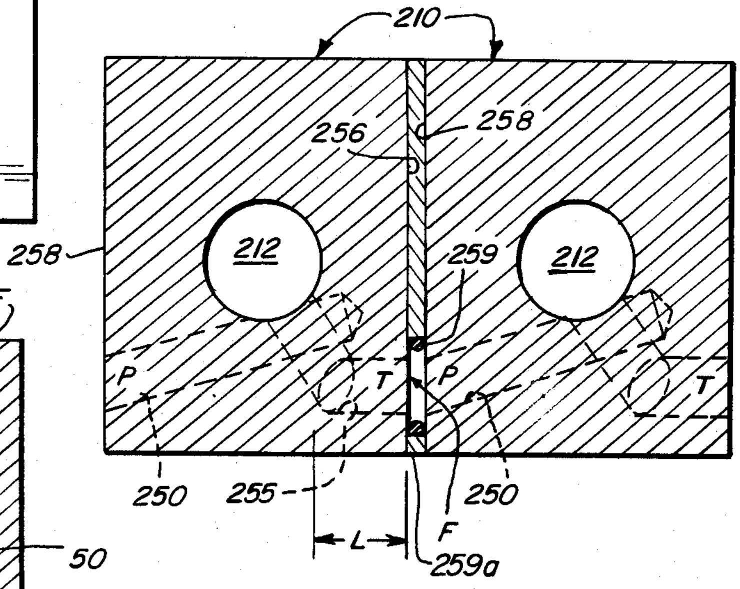
FIG. 9
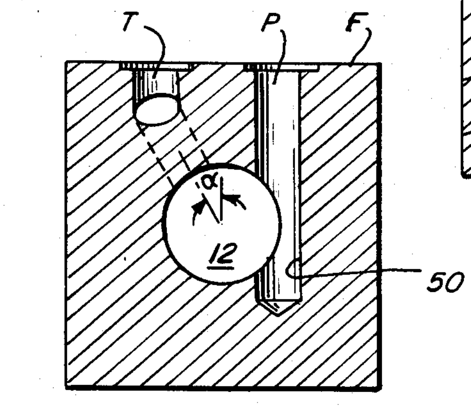
FIG. 8

HYDRAULIC SOLENOID VALVE STRUCTURE

TECHNICAL FIELD

This invention relates to hydraulic solenoid valves and in particular to means for biasing a spool member of the solenoid valve.

BACKGROUND ART

Solenoid-operated directional control valves are well known in the art having wide applications in both mobile and industrial uses. Such valves provide high flow capacity with small space requirement. Such valves utilize spring biasing means for biasing the spool to preselected positions for repositioning thereof by the action of the solenoid operator.

In one improved form of such control valves, the valve is shipped to the customer as a group of subassembly components. Thus, the valve may be provided with the coil, spool, valve block, and spring subassembly shipped separately. This permits the user of the valve to select any one of a plurality of different spools, coils, and spring subassemblies for use in a given control valve configuration.

It has been common to provide the spring subassembly as separate mounting tube, washer, and spring elements. The user selects the desired spring and installs it in the tube element. The washer is then placed in the assembly for cooperation with the spool when installed in the valve structure. Permitting the spring to be selected at the time of installation affords the user a wide range of possible valve configurations with minimum inventory.

However, the mounting of the spring and washer involves a somewhat difficult assembly procedure, and if not properly carried out, causes malfunctioning of the valve.

Another problem found in the prior art solenoid-operated spool valve structures is the presence of a pressure drop across the spool tending to oppose the return of the spool to the neutral position by the spring means upon de-energization of the solenoid coil. One of the causes of such pressure differential is the flow restriction of the tank port. Thus, it has been common to utilize a relatively large tank port diameter. However, in the prior art valves, this has necessitated correspondingly increasing the size of the valve body to accommodate the large tank port size.

DISCLOSURE OF INVENTION

The present invention comprehends an improved hydraulic solenoid valve structure eliminating the disadvantages of the prior art valve structures as discussed above in a novel and simple manner.

More specifically, the invention comprehends the provision of improved spool biasing spring means wherein the spring assembly is effectively maintained so as to avoid loss of the spring assembly elements, while yet permitting facilitated selective use of any one of a plurality of different strength springs in the assembly when desired.

The invention further comprehends an improved arrangement of the tank port means so as to minimize the pressure drop between opposite sides of the spool so as to facilitate return of the spool to the neutral position by the spring means.

The invention further comprehends the arrangement of the tank port so as to extend into a corner portion of the parallelepiped valve body, permitting the valve body to have effectively minimum height, while yet providing a relatively large cross section tank port.

The outlet from the tank port opens through the adjacent face of the valve body so as to minimize pressure drop therethrough.

More specifically, the invention comprehends providing in a hydraulic valve structure having a body defining a valve chamber and a plurality of ports opening to the chamber, a spool movably disposed in the chamber for selectively controlling fluid flow through the ports and defining an annular shoulder at one end of the valve chamber, a solenoid having a plunger for selectively urging the spool toward the other end of the chamber as an incident of energization of the solenoid, a tube extending coaxially about the plunger and defining a recess opening to the one end of the valve chamber, a washer in the recess coaxially abutting the annular shoulder, a compression spring in the recess coaxially of the plunger urging the washer toward the other end of the valve chamber, and means retaining the spring and washer in association with the tube in the recess whereby the tube, spring and washer may comprise a selected one of a plurality of similar unitary tube assemblies having similar tube and washer elements and different strength springs, permitting the selected tube assembly to have a spring strength coordinated with the characteristics of the spool.

The invention further comprehends the provision of a hydraulic valve structure having a body defining a valve chamber, a pressurized fluid inlet port opening to a midportion of the valve chamber, a first cylinder port opening to the valve chamber in spaced relationship to the inlet port, a second cylinder port opening to the valve chamber in oppositely spaced relationship to the inlet port, and a first outlet tank port opening to the valve chamber adjacent the first cylinder port, and a second outlet tank port opening to the valve chamber adjacent the second cylinder port, a spool reciprocably slidable in the valve chamber and having lands preventing communication through the valve chamber between the inlet port and either tank port in a neutral position of the spool, first solenoid means having a first plunger for selectively urging the spool in a first direction from the neutral position to cause concurrent communication between the inlet port and the first cylinder port and between the second cylinder port and the second outlet port, second solenoid means having a second plunger for selectively urging the spool in a second, opposite direction from the neutral position to cause concurrent communication between the inlet port and the second cylinder port and between the first cylinder port and the first outlet port, first biasing means for urging the spool in the first direction and the first plunger in the second direction, second biasing means for urging the spool in the second direction and the second plunger in the first direction, each biasing means comprising a tubular element defining a radially inner surface, an inner end, an outer shoulder on the tubular element inner surface, a biasing compression spring disposed coaxially within the tubular element and having an outer end abutting the outer shoulder thereon, the spring further defining an opposite inner end, a washer coaxially within the tubular element outwardly abutted by the inner end of the spring, and means on the tubular element removably retaining the washer in the tubular element, and a pair of shafts extending one each outwardly from the opposite ends of the spool, each shaft defining a distal end secured to an associated one of the plungers, a portion received in the associated one of the tubular elements and having a shoulder facing outwardly toward the outer shoulder of the tubular element, the washer outwardly abutting the shoulder and extending substantially fully between the shaft and the inner surface of the tubular element for reducing force exerted on the spool by fluid pressure in the valve chamber inwardly of the shaft shoulder.

Still further, the invention comprehends the provision in a hydraulic valve structure comprising a tank port in the body opening to the valve chamber at one end thereof and extending angularly from the end of the valve chamber to a position in the end portion transversely of the midportion of the valve chamber.

The invention comprehends the retention of the spring and washer in the solenoid tube assembly as a self-contained unit, making it possible for the ultimate user or distributor to assemble a desired valve configuration from a stock of the different components. The arrangement further provides improved facilitated maintenance.

The improved hydraulic solenoid valve structure of the present invention is extremely simple and economical of construction, while yet providing the highly desirable features discussed above.

BRIEF DESCRIPTION OF THE DRAWING

Other features and advantages of the invention will be apparent from the following description taken in connection with the accompanying drawing wherein:

FIG. 4 is a diametric section of the tube subassembly of the valve;

FIG. 5 is a diametric section illustrating a plug assembly for use in a modified form of the valve, eliminating the second solenoid operator where a two-position valve structure is provided;

FIG. 6 is a transverse section illustrating the extension of the pressure and tank ports to corners of the parallelepiped body;

FIG. 7 is a top plan view of a modified form of valve wherein each of the ports opens through a top face thereof;

FIG. 8 is a transverse section taken substantially along the line 8—8 of FIG. 7; and FIG. 9 is a schematic elevation illustrating a pair of valve structures embodying the invention arranged for series connection therebetween.

BEST MODE FOR CARRYING OUT THE INVENTION

Figure 3:
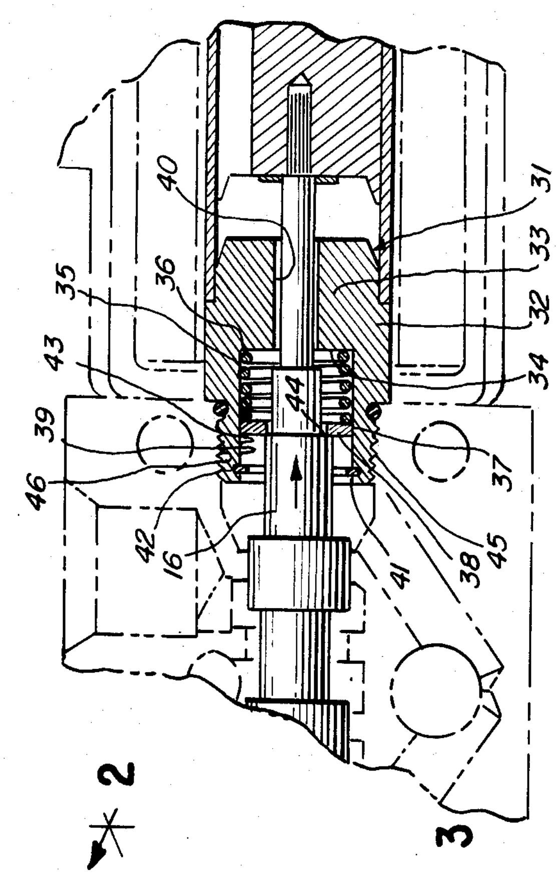
FIG. 3 is a fragmentary enlarged longitudinal section illustrating the compression of the spool centering spring means at one end thereof upon actuation of the opposite solenoid.

In the illustrative embodiment of the invention as disclosed in the drawing, a hydraulic valve structure generally designated 10 is shown to comprise a solenoid-operated valve having a valve body 11 provided with a through bore 12 defining a valve chamber and having opposite ends 13 and 14. A valve spool 15 is axially reciprocably slidable in the valve chamber and is provided at its opposite ends with stepped shaft portions 16 and 17.

Figure 2:
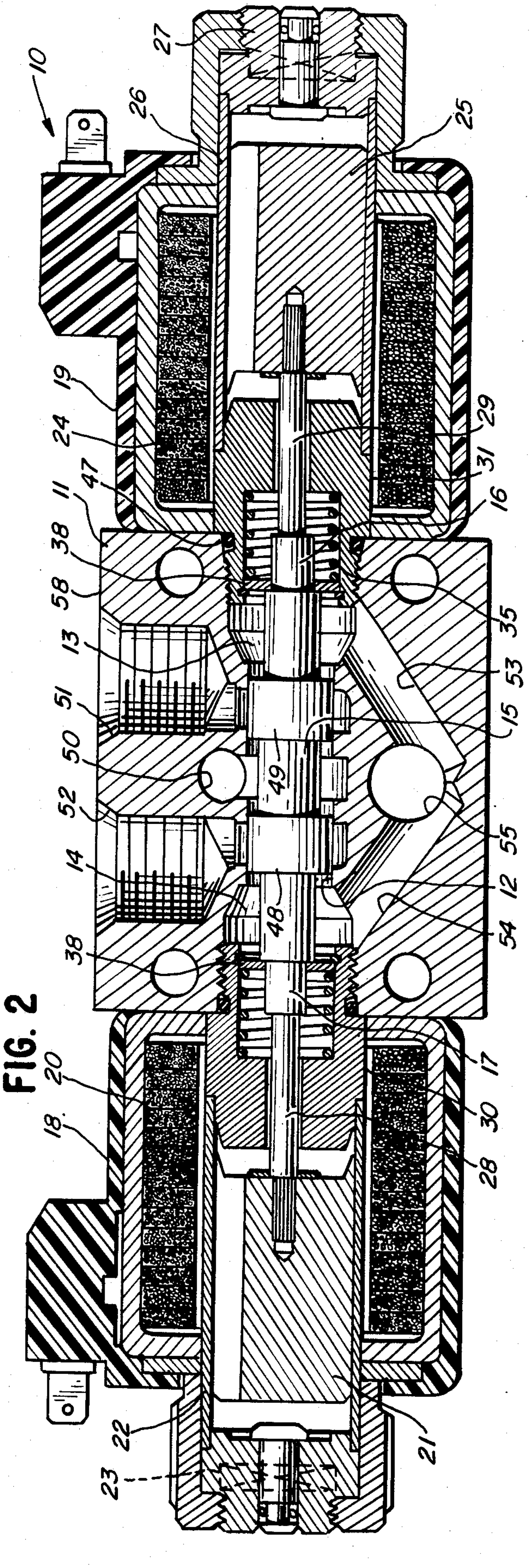
FIG. 2 is a longitudinal section taken substantially along the line 2—2 of FIG. 1.

In the illustrated embodiment, the valve 10 comprises a three-position valve utilizing a first solenoid 18 and a second solenoid 19 for selectively positioning the spool to the right or left from the neutral position illustrated in FIG. 2. Energization of the solenoid 18 causes a movement of the spool to the right, as seen in FIG. 2, and energization of the solenoid 19 causes a movement of the spool to the left, as seen in FIG. 2. The solenoids are of conventional construction, with solenoid 18 including a coil 20 and a plunger 21 received in a guide tube 22 closed at its outer end by a plug 23. Solenoid 19 similarly includes a coil 24, and a plunger 25 slidable in a guide tube 26 closed at its outer end by a plug 27.

Plunger 21 is provided with an actuator shaft 28, which engages the spool shaft 17, and plunger 25 is provided with an actuator shaft 29 which engages the spool shaft 16, as seen in FIG. 2.

The spool is biased to the neutral centered position of FIG. 2 by a pair of biasing assemblies 30 and 31. The biasing assemblies are identical, each including a tubular element 32 having an inturned outer end 33 defining an axially inwardly facing annular shoulder 34. A compression coil spring 35 has its outer end 36 seated against shoulder 34 and its inner end 37 seated against a washer 38 retained in the inner end 39 of the tubular element bore 40 by a constrictible lock ring 41 received in an annular groove 42 in the radially inner surface 43 of the bore portion 39.

In the centered disposition of the spool, as seen in FIG. 2, the biasing spring 35 of each of the biasing assemblies 30 and 31 causes the washer 38 associated therewith to abut the retaining ring. At the same time, the washer is urged into abutment with an annular shoulder 44 defined by the stepped end of the shaft 16.

The spacing between the washers 38 of the biasing assemblies 30 and 31 is preselected so as to be substantially equal to the length of the spool and shaft structure and centered relative to the longitudinal center of the valve chamber 12 so as to center the spool 15, as shown in FIG. 2. More specifically, the tubular element 32 includes a radially outwardly threaded inner portion 45 threaded into a threaded recess 46 in the body 11 at the outer end 13 of the valve chamber bore 12. A suitable annular seal 47 is provided between the tubular element 32 and the body 11 at the distal end of the body bore.

Biasing assembly 30 is identical to biasing assembly 31 and functions in a similar manner.

Spool 15 is provided with a pair of annular lands 48 and 49 in axially spaced relationship. In the neutral position of the spool, as shown in FIG. 2, a pressure port 50 provided in body 11 opens to the midportion of the valve chamber between lands 48 and 49. Pressurized hydraulic fluid may enter the valve chamber midportion between the lands, but is prevented from delivery to a pair of cylinder ports 51 and 52 which open to the valve chamber in alignment with lands 48 and 49 when the spool is in the neutral position, as shown in FIG. 2. Thus, the pressurized fluid is prevented from passing to either of cylinder ports 51 or 52 in the neutral position of the valve, whereby hydraulic fluid flow through the valve is effectively prevented.

Valve body 11 is further provided with a pair of bypass, or tank, ports 53 and 54 opening to the opposite ends of the valve chamber 13 and 14, respectively. The outer ends of the bypass ports 53 and 54 open to an outlet port 55.

One pressure port 50, as seen in FIG. 6, opens outwardly through a face 56 of the parallelepiped body 11. One outlet port 55 opens through the same face. The bypass port 53 extends into a corner portion 57 of the body at the lower end of face 56 and, thus, the outlet port 55 is relatively short. The bypass ports 53 and 54 have relatively large diameter so as to minimize pressure drop in the fluid flowing to tank through the outlet port 55. For use of the valves in a parallel arrangement, a second pressure port 50*a* and a second outlet port 55*a* are provided opening through opposite body face 56*a*. As shown, port 50*a* communicates with body bore 12 and pressure port 50, and port 55*a* communicates with bypass port 53 and outlet port 55.

Figure 1:
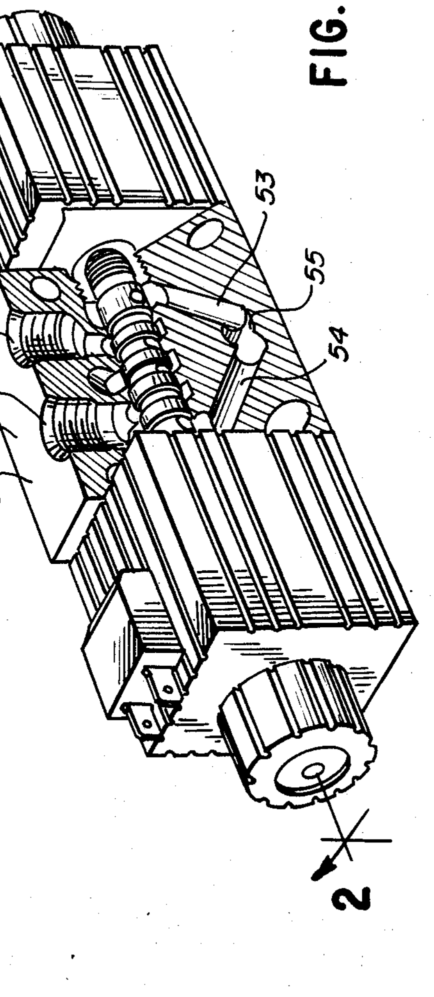
FIG. 1 is a perspective view of a hydraulic valve structure embodying the invention, with portion broken away to facilitate illustration of the spool and port arrangement thereof.

In the embodiment of FIGS. 1-6, the cylinder ports 51 and 52 open through an upper face 58 of the body, as best seen in FIGS. 1 and 2.

Alternatively, as seen in FIG. 7, a valve structure generally designated 110 may be arranged wherein the cylinder ports 51 and 52 open through face 156, whereby all connections to the valve may be effected at one face of the valve body.

As shown in FIG. 8, the pressure port 50 may extend tangentially to the valve chamber 12.

In another form for valve structure embodying the invention as disclosed in FIG. 9, each valve 210 is defined by a pressure port 250 which opens through body face 258 opposite body face 256, through which the tank port 255 opens. Thus, the valves 210 may be connected in series by means of a suitable annular resilient seal 259 located in an apertured retaining plate 259*a* and compressed between face 256 of a first valve body and face 258 of the next valve body surrounding the aligned tank and port openings thereof 255 and 250, respectively.

As indicated above, the invention has been described with reference to a three-position solenoid-operated hydraulic valve wherein the spool is selectively disposed in either a centered neutral position or in either of two shown positions. The invention is equally applicable to other forms of such spool valves. Illustratively, as shown in FIG. 5, a modified form of biasing assembly generally designated 331 is shown to comprise a biasing assembly generally similar to biasing assembly 31, but wherein the outer end 333 of the tubular element 332 is closed. Thus, the valve may be utilized with a single solenoid operator at the opposite end, with the spring 335 of the biasing assembly urging the spool similarly as spring 35 of valve structure 10. When the shaft end 316 is urged to the right, as seen in FIG. 5, to compress spring 335 by solenoid actuation of the valve, the spring 335 is compressed similarly as in the embodiment illustrated in FIG. 3, and upon de-energization of the solenoid, the spring returns the spool to the neutral position similarly as the neutral position of valve 10 shown in FIG. 2.

The invention comprehends the provision of the bypass ports in the different embodiments to extend angularly into the corner portion of the parallelepiped valve body so as to reduce the overall height of the valve, while yet providing a relatively large diameter bypass port leading to the tank outlet opening. The outlet port may be drilled perpendicularly to the face through which it opens so as to eliminate the need for drilling angle holes in the valve body, as shown in FIG. 6, thereby simplifying the manufacturing process and reducing the cost thereof.

The provision of the bypass ports to extend to closely adjacent the outlet port face provides for minimum pressure drop between the chamber end portions 13 and 14. Resultingly, less opposition to the biasing of the spool back to the neutral position by the compressed biasing spring results, providing more positive action of the valve.

Additionally, the use of washers 38 abutting the end of the spool shafts 16 and 17 prevents the fluid pressure in the valve chamber ends 13 and 14 from acting on the entire outer face of the shafts, thereby effectively minimizing the force developed by the pressure differential existing between the chambers 13 and 14 and thereby further facilitating rapid neutral positioning of the spool upon de-energization of the operating solenoid coil. This further minimizes the cost of manufacture by permitting the use of a lighter spring and provides for improved valve operation by permitting the use of a stronger solenoid so that greater flow through the valve can be controlled, thereby upgrading the performance of the valve.

By permitting the spring to be effectively retained in the tubular element of the biasing assemblies, loss of the spring in assembly of the valve in the field is effectively minimized. Further, by permitting selection of any one of a large number of different strength springs to be installed in the biasing assembly, a facilitated use of the valve structure with a wide range of flow requirements is obtained.

By use of the biasing assembly 331, the user may further adapt the valve for single solenoid operation while yet retaining all of the desirable features of the four-way, three-position valve end disclosed in illustrating a preferred embodiment of the invention.

The foregoing disclosure of specific embodiments is illustrative of the broad inventive concepts comprehended by the invention.

We claim:

1. In a hydraulic valve structure having a body defining a valve chamber and a plurality of ports opening to said chamber, a spool movably disposed in said chamber for selectively controlling fluid flow through said ports and defining an annular shoulder at one end of said valve chamber, and a solenoid having a plunger for selectively urging said spool toward the other end of said chamber as an incident of energization of said solenoid, the improvement comprising:

a tube extending coaxially about and slidably carrying said plunger, said tube defining a recess opening to said one end of said valve chamber;

a washer in said recess coaxially abutting said annular shoulder;

a compression spring in said recess coaxially of said plunger urging said washer toward said other end of the valve chamber; and means retaining said spring and washer in association with said tube in said recess whereby the tube, spring and washer may comprise a selected one of a plurality of similar assemblies having similar tube and washer elements and different strength springs, permitting the selected tube assembly to have a spring strength coordinated with the characteristics of the spool.

2. The valve structure of claim 1 wherein said means retaining said spring and washer in said recess comprises means aligned with said spring.

3. The valve structure of claim 1 wherein said means retaining said spring and washer in said recess comprises means removably mounted to said tube.

4. The valve structure of claim 1 wherein said means retaining said spring and washer in said recess comprises means removably mounted to said tube in said recess.

5. The valve structure of claim 1 wherein said means retaining said spring and washer in said recess comprises means removably mounted to said tube in said recess adjacent said one end of the valve chamber.

6. The valve structure of claim 1 wherein said washer is slidably fitted in said recess.

7. In a hydraulic valve structure having a body defining a valve chamber and a plurality of ports opening to said chamber, a spool movably disposed in said chamber for selectively controlling fluid flow through said ports and defining an annular shoulder at one end of said valve chamber, and a solenoid having a plunger for selectively urging said spool toward the other end of said chamber as an incident of energization of said solenoid, the improvement comprising:

a tube extending coaxially about and slidably carrying said plunger, said tube defining a recess opening to said one end of said valve chamber;

a washer in said recess coaxially abutting said annular shoulder;

a compression spring in said recess coaxially of said plunger urging said washer toward said other end of the valve chamber, said washer being associated with said spool so as to prevent fluid pressure in said valve chamber at said one end from acting on said annular shoulder; and means retaining said spring and washer in association with said tube in said recess whereby the tube, spring and washer assembly may comprise a selected one of a plurality of similar assemblies having similar tube and washer elements and different strength springs, permitting the selected tube assembly to have a spring strength coordinated with the characteristics of the spool.

8. The valve structure of claim 7 wherein said washer is slidably fitted in said recess.

9. The valve structure of claim 7 wherein said spring urges said washer against said annular shoulder with a force suitably to cause the washer to dynamically sealingly abut said annular shoulder.

10. The valve structure of claim 7 wherein said spring urges said washer against said annular shoulder with a force suitably to cause the washer to dynamically sealingly abut said annular shoulder in opposition to fluid pressure forces in said valve chamber one end acting on said washer urging said washer away from abutment with said annular shoulder.

11. In a hydraulic valve structure having a body defining a valve chamber, a pressurized fluid inlet port opening to a midportion of the valve chamber, a first cylinder port opening to said valve chamber in spaced relationship to said inlet port, a second cylinder port opening to said valve chamber in oppositely spaced relationship to said inlet port, and a first outlet tank opening to said valve chamber adjacent said first cylinder port, and a second outlet tank port opening to said valve chamber adjacent said second cylinder port;

a spool reciprocably slidable in said valve chamber and having lands preventing communication through said valve chamber between said inlet port and either tank port in a neutral position of the spool;

first solenoid means having a first plunger for selectively urging the spool in a first direction from said neutral position to cause concurrent communication between said inlet port and said first cylinder port and between said second cylinder port and said second outlet port;

second solenoid means having a second plunger for selectively urging the spool in a second opposite direction form said neutral position to cause concurrent communication between said inlet port and said second cylinder port and between said first cylinder port and said first outlet port;

first biasing means for urging the spool and first plunger in said first direction second biasing means for urging the spool and second plunger in said second direction each said biasing means comprising a tubular element defining an outer portion sidably carrying said second plunger, a radially inner surface, an inner end, and outer shoulder on the tubular element inner surface, a biasing compression opening disposed coaxially within the tubular element and having an outer end abutting said outer shoulder therein, said spring further defining an opposite inner end, a washer coaxially within said tubular element outwardly abutted by said inner end of the spring, and means on said tubular element removably retaining the washer in said tubular element; and a pair of shafts extending one each outwardly from the opposite ends of the spool, each shaft defining a distal end secured to an associated one of said plungers, a portion received in the associated one of said tubular elements and having a shoulder facing outwardly toward said outer shoulder of the tubular element, said washer outwardly abutting said shoulder and extending substantially fully between said shaft and said inner surface of the tubular element for reducing force exerted on the spool by fluid pressure in said valve chamber inwardly of said shaft shoulder.

12. The valve structure of claim 11 wherein said shaft shoulder comprises an annular shoulder.

13. The valve structure of claim 11 wherein said means removably retaining the washer in said tubular element comprises an annular groove in said inner surface of the tubular element and a resiliently constrictible locking ring received in said groove and projecting radially inwardly from said inner surface.

14. The valve structure of claim 11 wherein said means removably the washer in said claim 11 wherein said means removably retaining the washer in said tubular element comprises an annular groove in said inner surface of the tubular element at said inner end of the tubular element and a resiliently constrictible locking ring received in said groove and projecting radially inwardly from said inner surface.

15. The valve structure of claim 11 wherein said shaft end defines at least one additional annular shoulder outwardly of said first named shoulder.

16. The valve structure of claim 11 wherein said washer is slidably fitted in said inner surface of the tubular element.

17. The valve structure of claim 11 wherein said washer is slidably fitted in said inner surface of the tubular element and on the shaft outwardly of said shaft shoulder.

18. In a hydraulic valve structure comprising a parallelepiped body having a rectangular cross section defining a corner portion, a central through bore defining a valve chamber having an end portion and a midportion, and a spool movably disposed in said chamber, said body further defining a pressurized fluid inlet port opening to said midportion of the valve chamber, a first cylinder port opening to said valve chamber in spaced relationship to said inlet port, and a second cylinder port opening to said valve chamber in oppositely spaced relationship to said inlet port, the improvement comprising:

a tank port in said body opening to said valve chamber at said end portion thereof and extending angularly from said end portion of the valve chamber to a position transversely of said midportion of the valve chamber at said corner portion of the body cross section; and spring biasing means for resiliently positioning the spool in said chamber, said spring biasing means including a coil spring defining an inner end and an outer end, a spring retainer abutting an end portion of the spool and confronting said valve chamber outwardly of the opening of said tank port to said one end portion of the chamber, and means for retaining the outer end of the spring to compress the spring against said spool end portion.

19. The hydraulic valve structure of claim 18 wherein said means for retaining the outer end of the spring comprises an element removably secured to the valve body.

20. The hydraulic valve structure of claim 18 wherein said means for retaining the outer end of the spring comprises a tubular housing element having an end secured to the valve body, said spring retainer and coil spring being coaxially disposed within said housing element end.

21. The dydraulic valve structure of claim 18 wherein said means for retaining the outer end of the spring comprises a tubular housing element having an end secured to the valve body, said spring retainer and coil spring being coaxially disposed within said housing element end, and removable means on said housing element for retaining said spring retainer and spring within said housing element end.

* * * * *